United States Patent
Huang et al.

(10) Patent No.: US 9,475,913 B2
(45) Date of Patent: Oct. 25, 2016

(54) FOAM SHEET USING POLYLACTIC ACID HAVING EXTENDED CHAIN AND METHOD FOR PREPARING THE SAME

(71) Applicant: LG Hausys, Ltd., Seoul (KR)

(72) Inventors: Cheng Zhe Huang, Cheongju-si (KR); Chang Won Kang, Cheongju-si (KR); Ji Hyang Son, Daejeon (KR)

(73) Assignee: LG HAUSYS, LTD., Seoul (KR)

( * ) Notice: Subject to any disclaimer, the term of this patent is extended or adjusted under 35 U.S.C. 154(b) by 100 days.

(21) Appl. No.: 14/385,637

(22) PCT Filed: Dec. 27, 2012

(86) PCT No.: PCT/KR2012/011584
§ 371 (c)(1),
(2) Date: Sep. 16, 2014

(87) PCT Pub. No.: WO2013/147400
PCT Pub. Date: Oct. 3, 2013

(65) Prior Publication Data
US 2015/0329689 A1 Nov. 19, 2015

(30) Foreign Application Priority Data
Mar. 30, 2012 (KR) .......................... 10-2012-0033119

(51) Int. Cl.
*C08J 9/10* (2006.01)
*C08J 9/00* (2006.01)

(52) U.S. Cl.
CPC .............. *C08J 9/103* (2013.01); *C08J 9/0023* (2013.01); *C08J 9/10* (2013.01); *C08J 2203/04* (2013.01); *C08J 2300/16* (2013.01); *C08J 2367/02* (2013.01); *C08J 2367/04* (2013.01)

(58) Field of Classification Search
CPC .... C08J 9/0023; C08J 9/0066; C08J 9/0085; C08J 9/103; C08J 2367/02; C08J 2367/04; C08J 2471/02; C08J 2497/02; C08J 9/10; C08J 2203/04; C08J 2300/16
See application file for complete search history.

(56) References Cited

U.S. PATENT DOCUMENTS

| 4,255,371 A * | 3/1981 | Shimoyashiki | B29C 67/2295 264/211.2 |
|---|---|---|---|
| 2003/0212159 A1* | 11/2003 | Martinez | C08J 9/00 521/134 |
| 2008/0214688 A1* | 9/2008 | Hirabayashi | C08J 9/0004 521/95 |
| 2009/0270524 A1* | 10/2009 | Oka | C08J 9/0061 521/138 |
| 2010/0087556 A1* | 4/2010 | Britton | C08J 9/0061 521/57 |
| 2010/0098928 A1* | 4/2010 | Britton | C08J 9/0061 428/220 |
| 2010/0120932 A1* | 5/2010 | Yoshioka | C08J 9/0061 521/138 |

FOREIGN PATENT DOCUMENTS

| CN | 1958668 A | 5/2007 |
|---|---|---|
| CN | 101535405 A | 9/2009 |
| jp | 11-302424 | * 11/1999 |
| JP | 2002155197 A | 5/2002 |
| JP | 2003253028 A | 9/2003 |
| JP | 2005206813 A | 8/2005 |
| JP | 2008231184 A | 10/2008 |
| JP | 2008231285 A | 10/2008 |
| JP | 2009091588 A | 4/2009 |
| JP | 2010111740 A | 5/2010 |
| JP | 2010525099 A | 7/2010 |
| JP | 2011208042 A | 10/2011 |
| KR | 10-1998-072370 A | 11/1998 |
| KR | 10-2008-0067424 A | 7/2008 |
| KR | 20090008899 A | 1/2009 |
| KR | 10-2009-0086814 A | 8/2009 |

OTHER PUBLICATIONS

Lotader® AX 8900 Datasheet, Ethylene Methyl Acrylate Acrylic Acid, 2016.*
Japanese Office Action dated Sep. 29, 2015 in connection with the counterpart Japanese Patent Application No. 2015-503098, citing the above reference(s).
Chinese Office Action dated Oct. 30, 2015 in connection with the counterpart Chinese Patent Application No. 201280071773.8, citing the above reference(s).
International Search Report for PCT/KR2012/011584 mailed on Apr. 19, 2013, citing the above reference(s).

* cited by examiner

*Primary Examiner* — Irina S Zemel
(74) *Attorney, Agent, or Firm* — Hauptman Ham, LLP

(57) ABSTRACT

Disclosed is a foam sheet using polylactic acid, which provides the advantages of energy reduction and greenhouse gas reduction, and does not emit toxic substances such as toxic gas or endocrine-disrupting chemicals. The foam sheet, according to the present invention, comprises at least one resin layer comprising a biodegradable resin composition including the polylactic acid having an extended chain, a plasticizer, and a foaming agent, and thus provides the advantages of superior processing properties, superior water resistance after processing, energy reduction and greenhouse gas reduction, and of not emitting toxic substances such as toxic gas or endocrine-disrupting chemicals.

15 Claims, No Drawings

FOAM SHEET USING POLYLACTIC ACID HAVING EXTENDED CHAIN AND METHOD FOR PREPARING THE SAME

TECHNICAL FIELD

The present invention relates to a foam sheet using chain-extended polylactic acid and a method for preparing the same. More particularly, the present invention relates to a foam sheet, which is prepared by forming under specific conditions using a composition including chain-extended polylactic acid, a plasticizer and a foaming agent, followed by foaming at relatively high temperature, thereby securing excellent water resistance and processability and providing various effects including reduction of greenhouse gas, reduction in use of fossil resources, and no generation of toxic gases/endocrine disruptors, and to a method for preparing the same.

BACKGROUND ART

Foam sheets using petroleum resins such as polyvinyl chloride (PVC) and the like are widely used to various building structures such as houses, mansions, apartments, offices, shops, and the like.

Such foam sheets are prepared through extrusion or calendering of a resin such as polyvinyl chloride (PVC), and the like. However, since raw materials for these sheets are obtained from limited resources such as crude oil, it is anticipated that the depletion of petroleum resources will lead to various problems related to the supply of raw materials.

Moreover, considering increasing interest in environmental problems in recent years, there is a problem in that polyvinyl chloride (PVC) foam sheets are likely to emit toxic substances and create an environment burden when discarded.

To resolve such problems, a polylactic acid (or polylactide) resin, which is extracted and synthesized from plant resources, is spotlighted as a material capable of replacing petroleum resins in recent years. Polylactic acid is prepared by polymerization of lactic acid, which can be obtained by fermentation of starch extracted from renewable plant resources (corn, potatoes, sweet potatoes, and the like), and is an environmentally friendly resin enabling reduction in $CO_2$ emissions and conservation of non-renewable energy sources. A number of references including Korean Patent Publication No. 10-2008-0067424 disclose foam sheets using a polylactic acid resin.

However, since polylactic acid is easily hydrolyzed at certain humidity and temperature, there is a drawback in that a board prepared from the polylactic acid resin clings to a processing apparatus upon thermal lamination or is not easily stacked in multiple layers due to lack of viscoelasticity upon high temperature processing, as compared with existing boards prepared from a PVC resin. Therefore, it is an important issue to improve water resistance and processability of the foam sheet prepared from the polylactic acid resin.

Further, since polylactic acid has high crystallinity and a relatively low molecular weight and exhibits low melt strength, polylactic acid has a problem of low expansion ratio upon foaming.

DISCLOSURE

Technical Problem

It is an aspect of the present invention to provide a foam sheet using chain-extended polylactic acid and a method for preparing the foam sheet.

More particularly, the present invention is aimed at providing a foam sheet, which is prepared by forming under specific conditions using a composition including chain-extended polylactic acid, a plasticizer and a foaming agent, followed by foaming at relatively high temperature, thereby securing excellent water resistance and processability and providing various effects including reduction of greenhouse gas, reduction in use of fossil resources, and no generation of toxic gases/endocrine disruptors, and a method for preparing the same.

Technical Solution

In accordance with one aspect of the present invention, a foam sheet includes at least one resin layer formed of a biodegradable resin composition including chain-extended polylactic acid, a plasticizer, and a foaming agent.

In accordance with another aspect of the present invention, a method for preparing a foam sheet includes: inducing chain extension by heating a first composition including 100 parts by weight of a polylactic acid resin and 0.001 parts by weight to 10 parts by weight of a chain extender; preparing a sheet through extrusion or calendering of a second composition obtained by further adding 10 parts by weight to 100 parts by weight of a plasticizer and 0.1 parts by weight to 10 parts by weight of a foaming agent to the chain-extended first composition based on 100 parts by weight of the first composition; and foaming the sheet in an oven.

Advantageous Effects

According to the present invention, since the foam sheet using a polylactic acid resin uses a biodegradable resin including a chain-extended polylactic acid resin, the foam sheet allows easy thermal processing and exhibits improved physical properties in terms of water resistance, tensile strength, elongation and the like, as well as significantly improved foaming properties.

According to the present invention, since the foam sheet using the polylactic acid resin uses a plant resource-based polylactic acid resin instead of petroleum-based PVC generally used as a binder, the foam sheet can solve a problem of raw material supply due to depletion of petroleum resources, and emits a small amount of environmentally toxic substances and is environmentally friendly by enabling easy disposal thereof.

BEST MODE

The above and other aspects, features and advantages of the present invention will become apparent from the detailed description of the following embodiments in conjunction with the accompanying drawings. However, it should be understood that the present invention is not limited to the following embodiments and may be embodied in different ways, and that the embodiments are provided for complete disclosure and thorough understanding of the invention by those skilled in the art. The scope of the invention should be defined only by the accompanying claims and equivalents thereof.

Hereinafter, a foam sheet using a polylactic acid resin and a method for preparing the foam sheet according to embodiments of the present invention will be described in detail.

Foam Sheet

According to one embodiment of the present invention, a foam sheet includes at least one resin layer formed of a biodegradable resin composition including chain-extended polylactic acid, a plasticizer, and a foaming agent.

The foam sheet according to the invention uses chain-extended polylactic acid and thus exhibits excellent water resistance and processability as well as high expansion ratio.

First, the foam sheet according to the present invention includes polylactic acid. Polylactic acid is a thermoplastic polyester obtained by polymerization of lactide or lactic acid. For example, polylactic acid may be prepared by polymerization of lactide or lactic acid, which is obtained by fermentation of starch extracted from corn, potatoes, sweet potatoes and the like. Since corn, potatoes, sweet potatoes and the like are renewable plant resources, a polylactic acid resin obtained therefrom can effectively solve problems due to depletion of petroleum resources.

In addition, polylactic acid emits a much smaller amount of environmentally toxic substances, such as $CO_2$ and the like, during use or disposal than petroleum-based materials, such as polyvinyl chloride (PVC) and the like, and is environmentally friendly in that the polylactic acid resin is easily degradable in a natural environment even when discarded.

Polylactic acid can be classified into crystalline polylactic acid (c-polylactic acid) and amorphous polylactic acid (a-polylactic acid). Here, since a sheet using crystalline polylactic acid can suffer from bleeding, that is, a phenomenon that a plasticizer flows out of a surface of the foam sheet, amorphous polylactic acid may be used. When amorphous polylactic acid is used, there is a merit in that a compatibilizer, which would otherwise need to be added for prevention of bleeding, may be omitted. Polylactic acid may be 100% amorphous polylactic acid when amorphous polylactic acid is used, or may be a mixture of crystalline and amorphous polylactic acid, as needed.

Here, the polylactic acid may include at least one selected from among poly-L-lactic acid, poly-D-lactic acid and poly-L,D-lactic acid in consideration of processability, prevention of plasticizer bleeding, and the like.

The resin layer includes the chain-extended polylactic acid obtained by chain extension of polylactic acid using a chain extender. The chain extender may be any one selected from among epoxy compounds selected from the group consisting of bisphenol A diglycidyl ether, terephthalic acid diglycidyl ether, trimethylolpropane diglycidyl ether, and 1,6-hexanediol diglycidyl ether; isocyanate compounds selected from the group consisting of hexamethylene diisocyanate, tolylene diisocyanate, xylylene diisocyanate, diphenylmethane diisocyanate, and triisocyanate; acrylic compounds; maleic anhydride compounds; and copolymers including these compounds, without being limited thereto.

The chain extender may be present in an amount of 0.001 parts by weight to 10 parts by weight in the composition based on 100 parts by weight of polylactic acid. If the amount of the chain extender is less than 0.001 parts by weight, there is a problem in that chain extension is not started, and if the amount of the chain extender is greater than 10 parts by weight, there is a problem upon processing due to an extremely high degree of chain extension.

The plasticizer serves to improve processability of the foam sheet according to the invention. According to the present invention, the plasticizer may be an environmentally friendly plasticizer, and may include at least one selected from among citric acid, citric acid esters, epoxidized plant oils, fatty acid esters, polyethylene glycol, polyethylene propylene glycol, and glycerol esters, without being limited thereto.

Here, the plasticizer may be present in an amount of 10 parts by weight to 100 parts by weight based on 100 parts by weight of the chain-extended polylactic acid resin. If the amount of the plasticizer is less than 10 parts by weight or greater than 100 parts by weight, there is a problem of difficulty in processing.

The foaming agent may include at least one selected from among azodicarbonamide, p,p' oxybis(benzenesulfonyl hydrazide), p-toluenesulfonyl hydrazine, and benzenesulfonyl hydrazine, without being limited thereto.

The foaming agent may be present in an amount of 0.1 parts by weight to 10 parts by weight in the composition based on 100 parts by weight of the chain-extended polylactic acid. If the amount of the foaming agent is less than 0.1 parts by weight, the foam sheet can exhibit insignificant foaming, and if the amount of the foaming agent is greater than 10 parts by weight, the foam sheet can suffer from deterioration in strength since an excess of open cells is generated due to extremely high foaming According to the invention, the biodegradable resin composition may further include at least one selected from among a chain extension catalyst, a foaming aid, and inorganic fillers.

First, the chain extension catalyst serves to facilitate chain extension. The chain extension catalyst may be zinc stearate, without being limited thereto. The chain extension catalyst may be present in an amount of 1.0 part by weight or less based on 100 parts by weight of the chain-extended polylactic acid resin. If the amount of the chain extension catalyst is greater than 1.0 part by weight, the foam sheet can suffer from deterioration in properties due to reverse chain extension.

In addition, the foaming aid serves to facilitate foaming. The foaming aid may include at least one selected from among zinc oxide, zinc neodecanoate, potassium neodecanoate, and zinc 2-ethylhexanoate, without being limited thereto.

Here, the foaming aid may be present in an amount of 10 parts by weight or less based on 100 parts by weight of the chain-extended polylactic acid resin. If the amount of the foaming aid is greater than 10 parts by weight, the foam sheet can suffer from early foaming and an open cell foam shape during thermoforming due to excessive foaming.

Further, the inorganic filler may include inorganic fillers exhibiting excellent compatibility with the resin, specifically calcium carbonate, talc, wood fibers, and the like, without being limited thereto.

The inorganic fillers may be present in an amount of 300 parts by weight or less based on 100 parts by weight of the chain-extended polylactic acid resin. If the amount of the inorganic fillers is greater than 300 parts by weight, there is a problem in that the foam sheet is difficult to process and suffers from deterioration in strength due to extremely low amount of the resin.

Since polylactic acid of the foam sheet according to the present invention has increased molecular weight due to the chain extender, the foam sheet exhibits excellent water resistance and processability. Hereinafter, a method for preparing the foam sheet according to the present invention will be described in detail.

Method for Preparing Foam Sheet

According to one embodiment of the present invention, a method for preparing a foam sheet includes performing reaction of a first composition including 100 parts by weight of a polylactic acid resin and 0.001 parts by weight to 10 parts by weight of a chain extender at high temperature; preparing a sheet through extrusion or calendering of a second composition obtained by further adding 10 parts by weight to 100 parts by weight of a plasticizer and 0.1 parts by weight to 10 parts by weight of a foaming agent to the chain-extended first composition based on 100 parts by weight of the first composition; and foaming the sheet in an oven.

First, the chain extender is introduced into the first composition including the polylactic acid resin according to the present invention, followed by reaction at high temperature, thereby extending a terminal chain of polylactic acid.

The process is performed at a higher temperature than thermoforming, and may be performed at a temperature from about 100° C. to about 250° C. Here, thermal reaction can be induced via the chain extender included in the first composition, and a catalyst may be additionally used to increase reaction rate. Here, an extruder and a kneader may be used.

Next, the second composition obtained by further adding the plasticizer, the foaming agent and the like to the chain-extended first composition is subjected to extrusion or calendering, thereby preparing the sheet.

Here, the raw materials are mixed or kneaded. For example, mixing or kneading of liquid or powder raw materials may be performed using a super mixer, an extruder, a kneader, a 2-roll or 3-roll machine, and the like.

In addition, for more efficient mixing in the process of mixing and kneading of the raw materials, the mixed raw materials may be subjected to kneading at about 120° C. to about 200° C. using a Banbury mixer or the like. The process of mixing and kneading may be repeatedly performed in multiple stages, for example, by kneading the raw materials, followed by primary and secondary mixing of the kneaded raw materials at about 120° C. to about 200° C. using a 2-roll machine or the like. Here, details of each of the raw materials are as described above.

Next, the sheet is subjected to foaming in an oven. Here, foaming is performed at 150° C. to 250° C. If the temperature is less than 150° C., the sheet is not foamed, and if the temperature is greater than 250° C., there is a problem in that the sheet suffers from significant deterioration in flexibility due to severe volatilization of the plasticizer.

The sheet may be foamed by a general method known in the art, without being limited thereto.

According to the present invention, the method for preparing the foam sheet enables extremely easy working of the sheet due to excellent processability of the sheet.

Preparation of Foam Sheet

Hereinafter, the present invention will be explained in more detail with reference to some examples. However, it should be understood that these examples are provided for illustration only and are not to be in any way construed as limiting the present invention.

A description of details apparent to those skilled in the art will be omitted for clarity.

Example 1

100 parts by weight of poly-L-lactide, and 1.0 part by weight of ethylene-acrylic ester-glycidyl methacrylate corresponding to a chain extender were mixed using a super mixer. Next, the mixed raw materials were subjected to chain extension using a twin-screw extruder at 210° C., thereby preparing a chain-extended resin in pellet form.

100 parts by weight of the prepared chain-extended resin, and 40 parts by weight of a plasticizer (citric acid) and 5 parts by weight of a foaming agent (80% of azodicarbonate/ 20% of 4,4'-oxydibenzenesulfonylhydrazide) based on 100 parts by weight of the chain-extended resin were kneaded in a Banbury mixer at 130° C., thereby preparing a composition for foam molding. The prepared composition was formed into a 120 µm thick sheet using a 2-roll machine set to 100° C., followed by foaming in a foaming oven at 190° C. for 40 seconds, thereby preparing a foam sheet.

Example 2

A foam sheet was prepared in the same manner as in Example 1 except that poly-D-lactide was used instead of the poly-L-lactide.

Example 3

A foam sheet was prepared in the same manner as in Example 1 except that poly-L,D-lactide was used instead of the poly-L-lactide.

Example 4

A foam sheet was prepared in the same manner as in Example 1 except that 100 parts by weight of a filler (calcium carbonate) and 2 parts by weight of a foaming aid (zinc neodecanoate) were further added to the composition for foam molding based on 100 parts by weight of the chain-extended resin.

Example 5

A foam sheet was prepared in the same manner as in Example 4 except that 0.5 parts by weight of a chain extension catalyst (zinc stearate) was further added to the chain-extended resin.

Comparative Example 1

A foam sheet was prepared in the same manner as in Example 1 except that chain-unextended polylactic acid was used.

Evaluation

Each of the foam sheets prepared in Examples and Comparative Examples was evaluated as to properties (tensile strength, immersion shrinkage) and expansion ratio. Results are shown in Table 1.

TABLE 1

|  | Example 1 | Example 2 | Example 3 | Example 4 | Example 5 | Comparative Example 1 |
|---|---|---|---|---|---|---|
| Tensile strength (kg/1.5 cm) | 12.0 | 12.1 | 12.3 | 12.2 | 12.3 | 5.9 |
| Immersion shrinkage (%) | 0.17 | 0.17 | 0.17 | 0.15 | 0.14 | 0.79 |
| Expansion ratio (%) | 252 | 255 | 257 | 260 | 262 | 132 |

As shown in Table 1, it can be confirmed that, since the foam sheet according to the present invention used the chain-extended polylactic acid, a polylactic acid foam sheet, which exhibited good water resistance, good processability and high expansion ratio, could be prepared.

Although the present invention has been described with reference to some embodiments, it should be understood that the foregoing embodiments are provided for illustrative purposes only, and that various modifications, changes, alterations, and equivalent embodiments can be made by those skilled in the art without departing from the spirit and scope of the invention. Therefore, the scope of the invention should be limited only by the accompanying claims and equivalents thereof.

The invention claimed is:

1. A foam sheet comprising: at least one resin layer formed of a biodegradable resin composition comprising chain-extended polylactic acid, a plasticizer, a foaming agent, a chain extension catalyst, a foaming aid, and inorganic fillers,
   wherein the chain-extended polylactic acid is obtained from 100% amorphous polylactic acid,
   wherein the chain-extended polylactic acid is extended by a chain extender and the chain extension catalyst,
   wherein the chain extender is ethylene-acrylic ester-glycidyl methacrylate,
   wherein the chain extension catalyst is presented in an amount of 0.5 parts by weight to 1.0 parts by weight based on 100 parts by weight of the chain-extended polylactic acid,
   wherein the plasticizer is presented in an amount of 40 parts by weight to 100 parts by weight based on 100 parts by weight of the chain-extended polylactic acid,
   wherein the foaming aid comprises at least one selected from the group consisting of zinc neodecanoate, potassium neodecanoate, and zinc 2-ethylhexanoate, and
   wherein the inorganic fillers are presented in an amount of 100 parts by weight to 300 parts by weight based on 100 parts by weight of the chain-extended polylactic acid resin.

2. The foam sheet according to claim 1, wherein the resin layer comprises 0.1 parts by weight to 10 parts by weight of the foaming agent based on 100 parts by weight of the chain-extended polylactic acid.

3. The foam sheet according to claim 1, wherein polylactic acid comprises at least one selected from among poly-L-lactide, poly-D-lactide, or poly-L,D-lactide.

4. The foam sheet according to claim 1, wherein the plasticizer comprises at least one selected from among citric acid, citric acid esters, epoxidized plant oils, fatty acid esters, polyethylene glycol, polyethylene propylene glycol, or glycerol esters.

5. The foam sheet according to claim 1, wherein the foaming agent comprises at least one selected from among azodicarbonamide, p,p' oxybis(benzenesulfonyl hydrazine), p-toluenesulfonylhydrazine, or benzenesulfonylhydrazine.

6. The foam sheet according to claim 1, wherein the chain extension catalyst is zinc stearate.

7. The foam sheet according to claim 1, wherein the foaming aid is present in an amount of 10.0 parts by weight or less based on 100 parts by weight of the chain-extended polylactic acid resin.

8. The foam sheet according to claim 1, wherein the inorganic fillers comprise at least one selected from among calcium carbonate, talc, and wood fibers.

9. A method for preparing a foam sheet, comprising:
   performing chain extension by heating a first composition comprising 100 parts by weight of a 100% amorphous polylactic acid resin, 0.5 parts by weight to 1.0 parts by weight of a chain extension catalyst, and 0.001 parts by weight to 10 parts by weight of a chain extender;
   preparing a sheet through extrusion or calendering of a second composition obtained by further adding 40 parts by weight to 100 parts by weight of a plasticizer, a foaming aid, 100 parts by weight to 300 parts by weight of inorganic fillers, and 0.1 parts by weight to 10 parts by weight of a foaming agent to the chain-extended first composition based on 100 parts by weight of the first composition; and
   foaming the sheet in an oven,
   wherein the chain extender is ethylene-acrylic ester-glycidyl methacrylate,
   wherein the foaming aid comprises at least one selected from the group consisting of zinc neodecanoate, potassium neodecanoate, and zinc 2-ethylhexanoate.

10. The method for preparing a foam sheet according to claim 9, wherein the amorphous polylactic acid comprises at least one selected from the group consisting of poly-L-lactide, poly-D-lactide, and poly-L,D-lactide.

11. The method for preparing a foam sheet according to claim 9, wherein the plasticizer comprises at least one selected from the group consisting of citric acid, citric acid esters, epoxidized plant oils, fatty acid esters, polyethylene glycol, polyethylene propylene glycol, and glycerol esters.

12. The method for preparing a foam sheet according to claim 9, wherein the foaming agent comprises at least one selected from the group consisting of azodicarbonamide, p,p' oxybis(benzenesulfonyl hydrazine), p-toluenesulfonylhydrazine, and benzenesulfonylhydrazine.

13. The method for preparing a foam sheet according to claim 9, wherein the chain extension catalyst is zinc stearate.

14. The method for preparing a foam sheet according to claim 9, wherein the foaming aid is present in an amount of 10.0 parts by weight or less based on 100 parts by weight of the amorphous polylactic acid resin.

15. The method for preparing a foam sheet according to claim 9, wherein the inorganic fillers comprise at least one selected from among calcium carbonate, talc, or wood fibers.

* * * * *